United States Patent
Yi et al.

(10) Patent No.: US 10,038,701 B2
(45) Date of Patent: *Jul. 31, 2018

(54) METHOD FOR DETECTING SECURITY ERROR IN MOBILE TELECOMMUNICATIONS SYSTEM AND DEVICE OF MOBILE TELECOMMUNICATIONS

(71) Applicant: LG ELECTRONICS INC., Seoul (KR)

(72) Inventors: Seung June Yi, Gyeonggi-do (KR); Sung Jun Park, Gyeonngi-do (KR); Young Dae Lee, Gyeonggi-do (KR); Sung Duck Chun, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 193 days.

This patent is subject to a terminal disclaimer.

(21) Appl. No.: 14/833,526

(22) Filed: Aug. 24, 2015

(65) Prior Publication Data

US 2015/0365194 A1 Dec. 17, 2015

Related U.S. Application Data

(63) Continuation of application No. 14/585,710, filed on Dec. 30, 2014, now Pat. No. 9,167,433, which is a (Continued)

(30) Foreign Application Priority Data

Jul. 23, 2008 (KR) .................. 10-2008-0071933

(51) Int. Cl.
*H04L 29/06* (2006.01)
*H04L 1/00* (2006.01)
*H04L 12/703* (2013.01)
*H04W 12/10* (2009.01)
*H04L 12/939* (2013.01)
*H04W 12/06* (2009.01)
*G06F 11/10* (2006.01)
*H04W 76/19* (2018.01)
*H04W 76/18* (2018.01)
*H04W 12/02* (2009.01)

(52) U.S. Cl.
CPC ........ *H04L 63/123* (2013.01); *G06F 11/1004* (2013.01); *H04L 1/0061* (2013.01);
(Continued)

(58) Field of Classification Search
CPC . H04L 1/00; H04L 63/123; H04L 9/00; H04L 12/939; H04L 12/703; H04J 3/06;
(Continued)

(56) References Cited

U.S. PATENT DOCUMENTS

| | | | |
|---|---|---|---|
| 5,878,041 | A | 3/1999 | Yamanaka et al. |
| 6,874,113 | B2 | 3/2005 | Chao et al. |

(Continued)

FOREIGN PATENT DOCUMENTS

| | | |
|---|---|---|
| CN | 1390425 | 1/2003 |
| CN | 1437368 | 8/2003 |

(Continued)

OTHER PUBLICATIONS

Korean Intellectual Property Office Application Serial No. 10-2008-0077562, Notice of Allowance dated Dec. 23, 2014, 2 pages.

(Continued)

*Primary Examiner* — Thanhnga B Truong
(74) *Attorney, Agent, or Firm* — Lee Hong Degerman Kang Waimey

(57) ABSTRACT

According to one embodiment, a method of performing a re-establishment procedure in a mobile communication system includes: receiving at least one packet data convergence protocol (PDCP) control plane data unit; performing an integrity check on the at least one PDCP control plane data unit; identifying an integrity check failure with regard to the at least one PDCP control plane data unit; and performing a re-establishment procedure if the integrity check failure is identified to exist with regard to the at least one PDCP control plane data unit.

16 Claims, 9 Drawing Sheets

Related U.S. Application Data continuation of application No. 14/203,287, filed on Mar. 10, 2014, now Pat. No. 8,989,382, which is a continuation of application No. 13/541,574, filed on Jul. 3, 2012, now Pat. No. 8,712,005, which is a continuation of application No. 12/667,860, filed as application No. PCT/KR2008/004514 on Aug. 4, 2008, now Pat. No. 8,243,931.

(60) Provisional application No. 60/955,040, filed on Aug. 10, 2007.

(52) U.S. Cl.
CPC ............ *H04L 45/28* (2013.01); *H04L 49/552* (2013.01); *H04L 49/555* (2013.01); *H04L 69/22* (2013.01); *H04W 12/06* (2013.01); *H04W 12/10* (2013.01); *H04W 76/18* (2018.02); *H04W 76/19* (2018.02); *H04W 12/02* (2013.01)

(58) Field of Classification Search
CPC ........ H04Q 7/00; H04W 76/02; H04W 12/06; H04W 12/10; G06F 11/10
USPC ......... 380/270; 714/807; 370/350, 331, 503; 713/168, 170; 726/23, 27, 6
See application file for complete search history.

(56) References Cited

U.S. PATENT DOCUMENTS

| | | | |
|---|---|---|---|
| 6,987,985 B2 | 1/2006 | Purkayastha et al. | |
| 7,009,940 B2 | 3/2006 | Vialen et al. | |
| 7,180,885 B2 | 2/2007 | Terry | |
| 7,561,561 B2* | 7/2009 | Wu | H04L 1/1671 370/350 |
| 7,796,505 B2 | 9/2010 | Olsson et al. | |
| 8,014,307 B2* | 9/2011 | Vialen | H04W 12/06 370/252 |
| 8,027,321 B2 | 9/2011 | Ruobin | |
| 8,243,931 B2 | 8/2012 | Yi et al. | |
| 8,270,361 B2 | 9/2012 | Yi et al. | |
| 8,335,189 B2 | 12/2012 | Wang et al. | |
| 8,699,711 B2 | 4/2014 | Mukherjee et al. | |
| 8,712,055 B2 | 4/2014 | Yi et al. | |
| 8,797,956 B2 | 8/2014 | Hapsari et al. | |
| 8,812,009 B2 | 8/2014 | Chun et al. | |
| 8,989,382 B2 | 3/2015 | Yi et al. | |
| 2002/0009999 A1 | 1/2002 | Lee et al. | |
| 2004/0146019 A1 | 7/2004 | Kim et al. | |
| 2004/0156330 A1 | 8/2004 | Yi et al. | |
| 2004/0229626 A1 | 11/2004 | Yi et al. | |
| 2004/0235447 A1 | 11/2004 | Gronberg et al. | |
| 2005/0020260 A1 | 1/2005 | Jeong et al. | |
| 2005/0041681 A1 | 2/2005 | Lee et al. | |
| 2005/0063347 A1 | 3/2005 | Sarkkinen et al. | |
| 2005/0237972 A1 | 10/2005 | Van Dervelde et al. | |
| 2006/0030342 A1 | 2/2006 | Hwang et al. | |
| 2006/0067238 A1 | 3/2006 | Olsson et al. | |
| 2006/0067364 A1 | 3/2006 | Jung et al. | |
| 2006/0072503 A1 | 4/2006 | Kim et al. | |
| 2006/0251027 A1 | 11/2006 | Chun et al. | |
| 2006/0272032 A1 | 11/2006 | Jogand-Coulomb et al. | |
| 2007/0006049 A1 | 1/2007 | Agha et al. | |
| 2007/0178878 A1 | 8/2007 | Ding | |
| 2007/0201397 A1 | 8/2007 | Zhang | |
| 2007/0206530 A1 | 9/2007 | Lee et al. | |
| 2007/0206531 A1 | 9/2007 | Pajukoski et al. | |
| 2007/0223526 A1 | 9/2007 | Jiang | |
| 2007/0297367 A1* | 12/2007 | Wang | H04L 63/0414 370/331 |
| 2008/0002688 A1 | 1/2008 | Kim et al. | |
| 2008/0043658 A1 | 2/2008 | Worrall | |
| 2008/0045224 A1 | 2/2008 | Lu et al. | |
| 2008/0045272 A1 | 2/2008 | Wang et al. | |
| 2008/0049682 A1 | 2/2008 | Ding et al. | |
| 2008/0081598 A1 | 4/2008 | Chandra et al. | |
| 2008/0232396 A1 | 9/2008 | Buckley et al. | |
| 2008/0261581 A1 | 10/2008 | Cai | |
| 2008/0268878 A1 | 10/2008 | Wang et al. | |
| 2008/0273610 A1 | 11/2008 | Malladi et al. | |
| 2009/0025060 A1 | 1/2009 | Mukherjee et al. | |
| 2009/0046617 A1 | 2/2009 | Tenny et al. | |
| 2009/0232076 A1 | 9/2009 | Kuo | |
| 2009/0305712 A1 | 12/2009 | Franceschini et al. | |
| 2009/0323574 A1 | 12/2009 | Koskinen et al. | |
| 2010/0103852 A1 | 4/2010 | Jactat | |
| 2010/0118890 A1 | 5/2010 | Chun et al. | |
| 2010/0202476 A1 | 8/2010 | Chun et al. | |
| 2010/0290427 A1 | 11/2010 | Sebire et al. | |

FOREIGN PATENT DOCUMENTS

| | | |
|---|---|---|
| CN | 1457202 | 11/2003 |
| CN | 1761260 | 4/2006 |
| CN | 1761356 | 4/2006 |
| CN | 1997227 | 7/2007 |
| EP | 1035745 | 9/2000 |
| EP | 1271800 | 1/2003 |
| EP | 1343267 | 9/2003 |
| EP | 1557967 | 7/2005 |
| EP | 1655879 | 5/2006 |
| EP | 1689130 | 8/2006 |
| EP | 1788751 | 5/2007 |
| JP | 2003-018050 | 1/2003 |
| JP | 2003-283592 | 10/2003 |
| JP | 2006-054718 | 2/2006 |
| JP | 2006514466 | 4/2006 |
| JP | 2010-518683 | 5/2010 |
| JP | 2010-519868 | 6/2010 |
| KR | 10-2002-0097304 | 12/2002 |
| KR | 10-2003-0012048 | 2/2003 |
| KR | 20030012048 | 2/2003 |
| KR | 10-2003-0068743 | 8/2003 |
| KR | 10-2004-0016065 | 2/2004 |
| KR | 10-2004-0016334 | 2/2004 |
| KR | 10-2005-0029395 | 3/2005 |
| KR | 10-2005-0092874 | 9/2005 |
| KR | 10-2005-0099472 | 10/2005 |
| KR | 10-2006-0069378 | 6/2006 |
| KR | 10-2006-0079784 | 7/2006 |
| KR | 10-2006-0090191 | 8/2006 |
| KR | 10-2006-0131671 | 12/2006 |
| KR | 10-2008-0085694 | 9/2008 |
| KR | 10-2009-0084756 | 8/2009 |
| WO | 99/037114 | 7/1999 |
| WO | 04/042964 | 5/2004 |
| WO | 2004/042963 | 5/2004 |
| WO | 2005/125226 | 12/2005 |
| WO | 2006/046894 | 5/2006 |
| WO | 2006046894 | 5/2006 |
| WO | 2006/116620 | 11/2006 |
| WO | 2007/039023 | 4/2007 |
| WO | 2007/066900 | 6/2007 |
| WO | 2007/078142 | 7/2007 |
| WO | 2007/078155 | 7/2007 |
| WO | 2007/078164 | 7/2007 |
| WO | 07/091838 | 8/2007 |
| WO | 2007/091831 | 8/2007 |
| WO | 2008/060097 | 5/2008 |
| WO | 2008060097 | 5/2008 |

OTHER PUBLICATIONS

LG Electronics Inc., "Handling of HFN de-synchronization," 3GPP TSG-RAN WG2 #60, R2-074746, Nov. 2007, 2 pages.
European Patent Office Application Serial No. 14003105.5, Search Report dated Dec. 9, 2014, 6 pages.
Korean Intellectual Property Office Application Serial No. 10-2008-0076181, Notice of Allowance dated Feb. 11, 2015, 2 pages.
NTT DoCoMo, Inc., "Uplink Synchronization," 3GPP TSG RAN WG2 #57, R2-070781, Feb. 2007, 3 pages.

(56) References Cited

OTHER PUBLICATIONS

Samsung, "MAC functions: ARQ," 3GPP TSG-RAN2 Meeting #51 Tdoc, R2-060374, Feb. 2006, 5 pages.
Korean Intellectual Property Office Application Serial No. 10-2008-0077128, Notice of Allowance dated Apr. 14, 2015, 2 pages.
Korean Intellectual Property Office Application Serial No. 10-2008-0084996, Office Action dated May 28, 2015, 4 pages.
Korean Intellectual Property Office Application Serial No. 10-2008-0078476, Office Action dated May 29, 2014, 5 pages.
U.S. Appl. No. 14/295,207, Notice of Allowance dated Jun. 12, 2015, 10 pages.
Korean Intellectual Property Office Application Serial No. 10-2008-0071933, Notice of Allowance dated Apr. 17, 2014, 2 pages.
Cohen, "An Improved SSCOP-like Scheme for Avoiding Unnecessary Retransmissions and Achieving Ideal Throughput," IEEE, 1996, pp. 855-862.
Korean Intellectual Property Office Application Serial No. 10-2008-0058653, Office Action dated Apr. 25, 2014, 4 pages.
U.S. Appl. No. 12/671,020, Notice of Allowance dated Feb. 14, 2013, 13 pages.
U.S. Appl. No. 12/452,905, Final Office Action dated Apr. 11, 2013, 20 pages.
U.S. Appl. No. 12/672,835, Final Office Action dated May 9, 2013, 16 pages.
U.S. Appl. No. 12/672,999, Final Office Action dated Jun. 6, 2013, 12 pages.
Rapporteur (ASUSTeK), "Summary of HFN de-synchronization problem off-line email discussion", R2-050318, 3GPP TSG RAN WG2 #46, Feb. 2005.
ASUSTeK, "On-line recovery of HFN synchronization due to RLC UM SN problem", R2-041940, 3GPP TSG-RAN WG2 meeting #44, Oct. 2004.
U.S. Appl. No. 12/672,835, Office Action dated Sep. 11, 2013, 16 pages.
In the U.S. Appl. No. 12/671,020, Final Office Action dated Oct. 3, 2012, 40 pages.
U.S. Appl. No. 12/452,905, Office Action dated Dec. 3, 2012, 38 pages.
Samsung, "MAC functions: ARQ," 3GPP TSG-RAN2 Meeting #51, Tdoc R2-060374, Feb. 2006, 5 pages.
European Patent Office Application Serial No. 08793118.4, Search Report dated Dec. 10, 2013, 6 pages.
U.S. Appl. No. 12/672,835, Final Office Action dated Dec. 19, 2013, 18 pages.
ZTE, "Redundant retransmission restraint in RLC-AM", R2-061234, 3GPP TSG-RAN WG2 meeting #53, May 2006, 5 pages.
Reuven Cohen, "An Improved SSCOP-like Scheme for Avoiding Unnecessary Retransmissions and Achieving Ideal Throughput", Conference on Computer Communications, Mar. 2006, 8 pages.
European Patent Office Application Serial No. 08766509.7, Office Action dated Dec. 5, 2012, 9 pages.
LG Electronics, "Overall control signaling structure for generic LTE TDD", R1-071848, 3GPP TSG RAN WG1 LTE TDD Ad Hoc, Apr. 2007, 4 pages.
Siemens, "Signaling in DL for uplink resource allocation", R1-061290, 3GPP TSG RAN WG1#45, May 2006, 6 pages.
European Patent Office Application Serial No. 08793155.6, Search Report dated Jan. 8, 2014, 10 pages.
LG Electronics Inc., "Handling of HFN de-synchronization", R2-074746, 3GPP TSG-RAN WG2 #60, Nov. 2007, 2 pages.
European Patent Office Application Serial No. 08793028.5, Search Report dated Mar. 12, 2014, 7 pages.
Nokia Siemens Networks, "Security Update," 3GPP TSG-RAN2 Meeting #59bis, R2-074526, XP050137055, Oct. 2007, 4 pages.
LG Electronics Inc., "Security de-synchronization," 3GPP TSG-RAN WG2 #59, R2-073258, XP050135984, Aug. 2007, 2 pages.
LG Electronics Inc., "Handling of HFN de-synchronization," 3GPP TSG-RAN WG2 #60, R2-074746, XP050137261, Nov. 2007, 2 pages.

The State Intellectual Property Office of the People's Republic of China Application Serial 201310223936.6, Office Action dated Jun. 1, 2015, 8 pages.
European Patent Office Application Serial No. 08844213.2, Search Report dated Jun. 23, 2015, 6 pages.
Korean Intellectual Property Office Application Serial No. 10-2008-0078477, Notice of Allowance dated Jun. 24, 2014, 2 pages.
LG Electronics, "Overall control signaling structure for generic LTD TDD," 3GPP TSG RAN WG1 LTE TDD Ad Hoc, R1-071848, Apr. 2007, 4 pages.
Siemens, "Signaling in DL for uplink resource allocation," 3GPP TSG RAN WG1 #45, R1-061290, May 2006, 6 pages.
Korean Intellectual Property Office Application Serial No. 10-2008-0078645, Notice of Allowance dated Jun. 26, 2014, 2 pages.
Korean Intellectual Property Office Application Serial No. 10-2008-0077366, Notice of Allowance dated Nov. 24, 2014, 2 pages.
LG Electronics, "Overall control signaling structure for generic LTE TDD," 3GPP TSG RAN WG1 LTE TDD Ad Hoc, R1-071848, Apr. 2007, 4 pages.
Korean Intellectual Property Office Application Serial No. 10-2008-0077778, Office Action dated Oct. 29, 2014, 4 pages.
Motorola, "LTE Random Access Procedure," 3GPP TSG-RAN WG2 #53, R2-061463, May 2006, 4 pages.
Ericsson, "Random Access Procedures for LTE," Joint RAN1/RAN2 meeting on LTE, Tdoc R2-060866, Mar. 2006, 7 pages.
MAC Rapporteurs (Qualcomm Europe, Ericsson), 3GPP TSG-RAN WG2 #59bis, R2-074531, Aug. 2007, 9 pages.
European Patent Office Application Serial No. 08841080.8, Certificate dated Sep. 9, 2015, 13 pages.
LG Electronics, "Discussion on random access back-off procedure," 3GPP TSG-RAN WG2 #60bis, R2-080189, Jan. 2008, 5 pages.
3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.0.0, XP002520880, Dec. 2007, 23 pages.
European Patent Office Application Serial No. 09151778.9, Office Action dated Oct. 16, 2015, 6 pages.
Samsung, "MAC functions: ARQ," 3GPP TSG-RAN2 Meeting #51, Tdoc R2-060374,, Feb. 2006, 5 pages.
European Patent Office Application Serial No. 08793118.4, Certificate dated Nov. 18, 2015, 13 pages.
Korean Intellectual Property Office Application Serial No. 10-2008-0084996, Notice of Allowance dated Nov. 27, 2015, 2 pages.
The State Intellectual Property Office of the People's Republic of China Application Serial No. 200880014193.9, Office Action dated Nov. 25, 2015, 17 pages.
U.S. Appl. No. 14/304,515, Office Action dated Jan. 13, 2016, 16 pages.
Qualcomm Europe, "L2 improvements and polling," 3GPP TSG-RAN WG2 #58, R2-072021, May 2007, 3 pages.
3rd Generation Partnership Project (3GPP), "Technical Specification Group Radio Access Network; Evolved Universal Terrestrial Radio Access (E-UTRA) Radio Link Control (RLC) protocol specification (Release 8)," 3GPP TS 36.322 V8.0.0, Dec. 2007, 35 pages.
Japan Patent Office Application Serial No. 2014-247208, Office Action dated Jan. 5, 2016, 4 pages.
3rd Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V1.0.0, Sep. 2007, 18 pages.
Nokia Corporation, et al., "MAC Header Format," 3GPP TSG-RAN WG2 #59bis, R2-073891, Oct. 2007, 5 pages.
European Patent Office Application Serial No. 14189433.7, Office Action dated Feb. 16, 2016, 5 pages.
European Patent Office Application Serial No. 08842001.3, Office Action dated Jan. 6, 2016, 15 pages.
State Intellectual Property Office of the People's Republic of China Application Serial No. 200880116346.0, Office Action dated Feb. 14, 2016, 8 pages.
U.S. Appl. No. 14/984,817, Office Action dated Feb. 23, 2016, 11 pages.

(56) References Cited

OTHER PUBLICATIONS

U.S. Appl. No. 14/852,960, Office Action dated Jan. 25, 2017, 156 pages.
The State Intellectual Property Office of the People's Republic of China Application Serial No. 201510686212.4, Office Action dated Feb. 23, 2018, 5 pages.

* cited by examiner

METHOD FOR DETECTING SECURITY ERROR IN MOBILE TELECOMMUNICATIONS SYSTEM AND DEVICE OF MOBILE TELECOMMUNICATIONS

CROSS-REFERENCE TO RELATED APPLICATIONS

This application is a continuation of U.S. patent application Ser. No. 14/585,710, filed on Dec. 30, 2014, now U.S. Pat. No. 9,167,433, which is a continuation of U.S. patent application Ser. No. 14/203,287, filed on Mar. 10, 2014, now U.S. Pat. No. 8,989,382, which is a continuation of U.S. application Ser. No. 13/541,574, filed on Jul. 3, 2012, now U.S. Pat. No. 8,712,055, which is a continuation of U.S. application Ser. No. 12/667,860, filed on Jan. 22, 2010, now U.S. Pat. No. 8,243,931, which is the National Stage filing under 35 U.S.C. 371 of International Application No. PCT/KR2008/004514, filed on Aug. 4, 2008, which claims the benefit of earlier filing date and right of priority to Korean Application No. 10-2008-0071933, filed on Jul. 23, 2008, and also claims the benefit of U.S. Provisional Application No. 60/955,040 filed on Aug. 10, 2007, the contents of which are all hereby incorporated by reference herein in their entirety.

TECHNICAL FIELD

The present invention relates to a method and device for detecting a security error in a security algorithm in use for a PDCP layer of an LTE (Long Term Evolution) system.

BACKGROUND ART

FIG. 1 is a network structure of an LTE (Long Term Evolution) system, the related art mobile communication system. For the LTE system, which has evolved from the existing UMTS system, basic standardizations are ongoing in the 3GPP.

An LTE network can be divided into an E-UTRAN (Evolved UMTS Terrestrial Radio Access Network) and a CN (Core Network). An E-UMTS includes a terminal (or UE (User Equipment)), a base station (eNB (Evolved NodeB), and an access gateway (aGW). The access gateway may be divided into a part that handles processing of user traffic and a part that handles control traffic. In this case, the access gateway part that processes the user traffic and the access gateway part that processes the control traffic may communicate with each other by using a new interface. One or more cells may exist in a single eNB. An interface for transmitting user traffic or control traffic may be used between eNBs. The CN may include the access gateway and a node or the like for user registration of the UE. An interface for discriminating the E-UTRAN and the CN may be used.

FIG. 2 shows an exemplary structure of a control plane (C-plane) of a radio interface protocol between the UE and the E-UTRAN based on the 3GPP radio access network standards. FIG. 3 shows an exemplary structure of a user plane (U-plane) of the radio interface protocol between the UE and the E-UTRAN based on the 3GPP radio access network standards.

The structure of the radio interface protocol between the UE and the E-UTRAN will now be described with reference to FIGS. 2 and 3.

The radio interface protocol has horizontal layers comprising a physical layer, a data link layer, and a network layer, and has vertical planes comprising a user plane (U-plane) for transmitting data information and a control plane (C-plane) for transmitting control signals. The protocol layers in FIGS. 2 and 3 can be categorized as a first layer (L1), a second layer (L2), and a third layer (L3) based on three lower layers of an open system interconnection (OSI) standard model widely known in the communication system. The radio protocol layers exist as pairs between the UE and the E-UTRAN and handle a data transmission in a radio interface.

The layers of the radio protocol control plane of FIG. 2 and those of the radio protocol user plane in FIG. 3 will now be described as follows.

The physical layer, the first layer, provides an information transfer service to an upper layer by using a physical channel. The physical layer is connected to an upper layer called a medium access control (MAC) layer via a transport channel. Data is transferred between the MAC layer and the physical layer via the transport channel. The transport channel is divided into a dedicated transport channel and a common channel according to whether or not a channel is shared. Between different physical layers, namely, between a physical layer of a transmitting side (sender) and that of a receiving side (receiver), data is transferred via the physical channel.

The second layer includes various layers. First, a medium access control (MAC) layer serves to map various logical channels to various transport channels and performs logical channel multiplexing by mapping several logical channels to a single transport channel. The MAC layer is connected to an upper layer called a radio link control (RLC) layer by a logical channel. The logical channel is divided into a control channel that transmits information of the control plane and a traffic channel that transmits information of the user plane according to a type of transmitted information.

An RLC (Radio Resource Control) layer, the second layer, segments or concatenates data received from an upper layer to adjust the data size so as for a lower layer to suitably transmit the data to a radio interface. In addition, in order to guarantee various QoSs required by each radio bearer RB, the RLC layer provides three operation modes: a TM (Transparent Mode); a UM (Unacknowledged Mode); and an AM (Acknowledged Mode). In particular, the RLC layer operating in the AM (referred to as an 'AM RLC layer', hereinafter) performs a retransmission function through an automatic repeat and request (ARQ) function for a reliable data transmission.

A packet data convergence protocol (PDCP) layer of the second layer performs a function called header compression that reduces the size of a header of an IP packet, which is relatively large and includes unnecessary control information, in order to efficiently transmit the IP packet such as an IPv4 or IPv6 in a radio interface having a narrow bandwidth. The header compression increases a transmission efficiency on a radio interface by allowing the header part of the data to transmit only the necessary information.

The RRC layer located at the lowermost portion of the third layer is defined only in the control plane, and controls a logical channel, a transport channel and a physical channel in relation to configuration, reconfiguration, and the release of radio bearers (RBs). Here, the RBs refer to a logical path provided by the first and second layers of the radio protocol for data transmission between the UE and the UTRAN. In general, the configuration of the RB refers to the process of stipulating the characteristics of a radio protocol layer and a channel required for providing a particular data service, and setting the respective detailed parameters and operation methods.

Hereinafter, the PDCP layer will now be described in detail. The PDCP layer is upwardly connected with the RRC layer or a user application, and downwardly connected with the RLC layer. In FIG. 4, the left side shows the structure of functions of the transmitting PDCP entity and the right side shows the structure of functions of receiving PDCP entity. The left transmitting side structure shows operations applied to a PDCP SDU when the PDCP layer receives the PDCP SDU from an upper entity, and the right receiving side structure shows operations applied to a PDCP PDU when the PDCP layer receives the PDCP PDU from a lower entity.

The PDCP are used for both the user plane and the control plane, and some functions of the PDCP are selectively applied according to a used plane. Namely, as shown in FIG. 4, the header compression function is applied only to data of the user plane, while an integrity protection function is applied only to data of the control plane.

A data processing procedure performed by the transmitting PDCP entity at the left side in FIG. 4 will now be described.

S1: The PDCP layer assigns a sequence number to a received PDCP SDU.

S2: If an established RB is an RB of a user plane, the PDCP layer performs header compression on the PDCP SDU.

S3: If the established RB is an RB of the control plane, the PDCP layer performs integrity protection operation on the PDCP SDU.

S4: The PDCP layer performs ciphering on data blocks generated according to the results of the step S2 or S3.

S5: The PDCP layer configures a PDCP PDU by attaching a proper header to the ciphered data blocks, and delivers the configured PDCP PDU to the RLC layer.

A data processing procedure performed by the receiving PDCP entity at the right side in FIG. 4 will now be described.

S6: The PDCP layer removes the header of the received PDCP PDU.

S7: The PDCP layer performs deciphering on the header-removed PDCP PDU.

S8: If the established RB is an RB of the user plane, the PDCP layer performs header decompression on the deciphered PDCP PDU.

S9: If the established RB is an RB of the control plane, the PDCP layer performs an integrity verification operation on the deciphered PDCP PDU.

S10: The PDCP layer delivers data blocks, namely, PDCP SDUs, which have been received through step S8 or S9, to an upper layer. If the established RB is an RB of the user plane, the PDCP layer performs reordering as necessary, and delivers the same to an upper layer.

The header compression performed by the PDCP layer will now be described. The header compression is reducing the size of a header based on the fact that an IP header of each IP packet belonging to the same packet stream is not mostly changed. Unchanged fields are stored in the form of context in a compressor of the transmitting side and in a decompressor of the receiving side, and when context is formed, only changed fields are transmitted to thereby reduce the overhead of the IP header. At an initial stage of the header compression, the compressor transmits a full header packet to form context with respect to a corresponding packet stream, so there is no gain with the header compression. But, after the context is formed in the decompressor, the compressor can transmit only a compressed header packet, so its gain is remarkably increased.

An ROHC (Robust Header Compression), a typical header compression scheme used in the LTE system, is used to reduce header information of a real time packet such as an RTP (Real-time Transport Protocol)/UDP (User Diagram Protocol)/IP (Internet Protocol). Here, the RTP/UDP/IP packet refers to a packet with relevant headers which have been added as data from an upper layer passes through an RTP, a UDP and an IP. It includes various header information required for the data to be transferred to a destination via the Internet and recovered. In general, as for the header size of the RTP/UDP/IP packet, the IPv4 (IP version 4) has a header size of 40 bytes and the IPv6 has a header size of 60 bytes. When the headers are compressed by using the ROHC, the 40 or 60-byte headers are reduced to 1 to 3-byte headers, obtaining remarkable gains.

FIG. 5 shows a change in a header size of a packet formed according to the ROHC. Specifically, FIG. 5 comparatively shows the change in the header size of the general RTP/UDP/IP packet and the change in the header size with the ROHC applied. When a packet stream is transmitted first, because context is not formed yet in the compressor of the transmitting side and in the decompressor of the receiving side, so a full header is transmitted to form context. When the full header is transmitted to a degree, context is formed, and thus, a compressed header can be transmitted. In this respect, the context may be damaged due to a loss or the like of packets midway, so it is required to transmit the full header at proper intervals. In general, the full header includes additional information to form the context, so it is slightly larger than a normal header.

The security function performed by the PDCP layer will now be described. As described above, the security includes two functions of ciphering and integrity protection. In the both functions, codes that vary for each packet are generated, with which original data is ciphered or checked for its integrity.

The codes that vary for each packet are generated by using a PDCP SN (Sequence Number) added to a header of each PDCP PDU, and one of code generation factors is COUNT. The COUNT has a length of 32 bits, of which the least significant bit (LSB) includes a PDCP SN and the other remaining most significant bits (MSB) include an HFN (Hyper Frame Number). The length of the PDCP SN is 5, 7 or 12 bits, namely, different for each RB, so the length of the HFN is different for each case as 27, 25 or 20 bits.

Ciphering is performed in a way as shown in FIG. 6. The transmitting side generates ciphered data by covering a code which is changed for each packet, namely, MASK, on original data. Here, covering of the MASK refers to performing XOR on the original data and the MASK by bits. When the thusly ciphered data is received, the receiving side covers the MASK again on the ciphered data to decipher it. Here, the MASK has a length of 32 bits and is generated from various input factors. In particular, in order to generate a different value for each packet, COUNT is generated by using a PDCP sequence number different for every PDCP PDU, and the generated COUNT is used as one of MASK generation input factors. Besides the COUNT, the MASK generation input factors include a 'bearer', an ID value of a corresponding RB, a 'Direction' having an upward or downward value, a 'CK (Ciphering Key)' exchanged by the terminal and the network in establishing an RB, or the like.

In addition, the integrity protection is performed in a way as shown in FIG. 7. Like the ciphering process, in the integrity protection process, a code, namely, 'MAC-I (Message Authentication Code-Integrity)', by using a 'COUNT' using the PDCP SN, a 'Bearer', an ID value of an RB, a 'Direction' having an upward or downward value, an 'IK (Integrity Protection Key)' exchanged by the terminal and the network in establishing an RB, or the like. Here, a difference from the ciphering process as shown in FIG. 6 is that the generated 'MAC-I' is not XORed with original data but attached to a PDCP PDU as shown in FIG. 7. When the receiving side receives the MAC-1-attached PDCP PDU, it generates an XMAC-I by using the same input factor as that used in the transmitting side and compares it with the MAC-I attached to the PDCP PDU. If the two values (namely, XMAC-I and the MAC-I attached to the PDCP PDU) are identical, it is determined that data has integrity, whereas if the two values are different, it is determined that data has been changed midway.

For some reasons, the MASK or the MAC-I of the transmitting side and the receiving side may be changed to cause an error in ciphering or integrity protection. The main reason for the MASK or the MAC-I to be changed is because HFN, the MSB of the COUNT, is changed. This occurs when numerous PDCP SDU are lost. The reason is because the MSB of the COUNT is HFN and the LSB of the COUNT is SN and if the PDCP SN reaches a maximum value, it returns to zero (0) and one HFN, the MSB, is increased. Namely, if PDCP SDUs are lost as many as to wrap around a PDCP SN space, de-synchronization of HFN occurs. For another reason, there may be an error that cannot be found even with a CRC (Cyclic Redundancy Code) inspection at a lower layer, and in this case, if the PDCP SN value is not within a valid range, HFN de-synchronization may occur.

When the HFN de-synchronization occurs, security fails. Thus, although the receiving side receives data, it cannot restore the original data, causing a problem that the receiving side continuously discards received data.

With this problem arising, the RB of the user plane and the RB of the control plane will be separately described.

First, in case of the RB of the user plane, received PDCP PDUs are deciphered and subjected to header decompression. At this time, if the PDCP PDUs are deciphered with an erroneous MASK, an error occurs continuously in the process of header compression, so the receiving side continuously discards the received PDCP PDUs.

Second, in case of the RB of the control plane, received PDCP PDUS are deciphered and subjected to integrity verification. If the PDCP PDUs are deciphered with an erroneous MASK or compared with an erroneous XMAC-I, errors continuously occur in the process of integrity verification, so the receiving side continuously discards the received PDCP PDUs.

This problem arises because a function of detecting HFN de-synchronization is not currently provided. As a result, once HFN de-synchronization occurs, it cannot be recovered, and the received PDUs since then have an error and thus continuously discarded.

TECHNICAL GIST OF THE PRESENT INVENTION

Therefore, it is an object of the present invention to allow a receiving side PDCP entity to determine whether or not HFN de-synchronization, namely, a security failure, occurs by using particular conditions, and inform an RRC to re-establish an RB or reset a security configuration of a transmitting side or a receiving side by using a PDCP RESET process if the HFN de-synchronization occurs.

To achieve the above object, there is provided a method for detecting a security error in a mobile communication system, including: (A) counting the number of erroneous packets among one or more received packets; (B) comparing the number of counted erroneous packets with a reference value; and (C) determining a security failure if the number of counted erroneous packets reaches the reference value.

The step (A) may include: receiving at least one packet transmitted from a transmitting side; removing a header of the at least one received packet; deciphering on the at least one header-removed packet; determining an error of a security failure of the at least one received packet by performing a process of deciphering a compressed header or performing an integrity verification process from the at least one deciphered packet; and increasing a count value if there is a packet determined to have an error of the security failure.

The one or more received packets may be data of a user plane or data of a control plane.

The method may further include: (D) if the number of counted erroneous packets reaches the reference value so as to be determined as the security failure, performing a recovery process of a security configuration.

The recovery process may include performing of a reset procedure of a PDCP layer.

The recovery process may include notifying to an RRC layer.

The RRC layer may re-establish an RB (Radio Bearer), re-establish an RRC connection or reset a security configuration with respect to a particular RB.

The step (A) is performed in a header decompression process of a PDCP (Packet Data Convergence Protocol) layer or in an integrity verification process of the PDCP layer.

The reference value may be different according to an RB.

To achieve the above object, there is also provided a method for detecting a security error in a mobile communication system, including: receiving at least one packet; performing integrity verification or header decompression on the at least one received packet; identifying an error on the at least one received packet while performing the integrity verification or header decompression; reporting the identified error to an RRC layer, if the at least one received packet is identified to have an error; and performing re-establishment by the RRC layer upon receiving the identified error.

The re-establishment may include at least one of RB re-establishment and re-establishment of a PDCP layer.

The re-establishment may be a re-establishment of an RRC connection.

The integrity verification may use XMAC-I, and the header decompression may use context.

The re-establishment of the PDCP layer may be a RESET of the PDCP layer.

The present invention provides the method for effectively detecting a security failure as it occurs at the PDCP layer of a receiving side, so any further data loss and a resultant waste of radio resources can be prevented.

MODE FOR CARRYING OUT THE PREFERRED EMBODIMENTS

Figure 1:
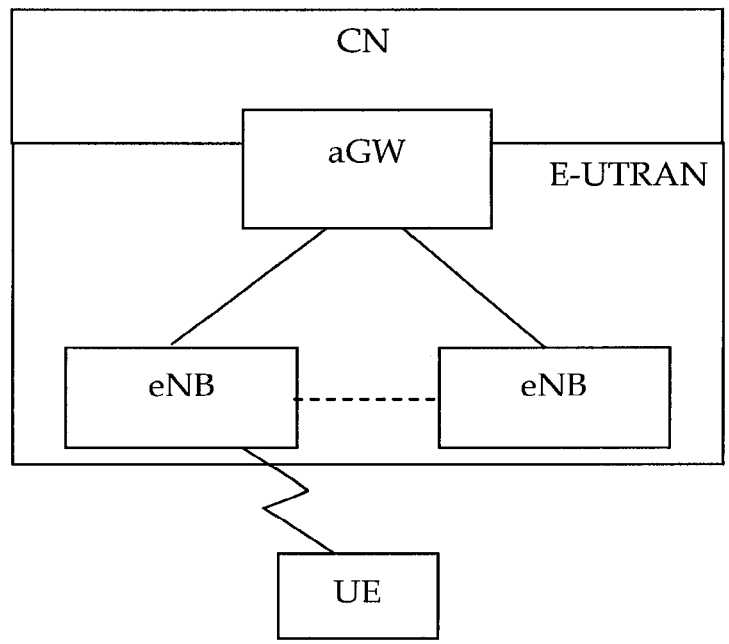
FIG. 1 shows a network structure of a Long Term Evolution (LTE), the related art mobile communication system.
Figure 2:
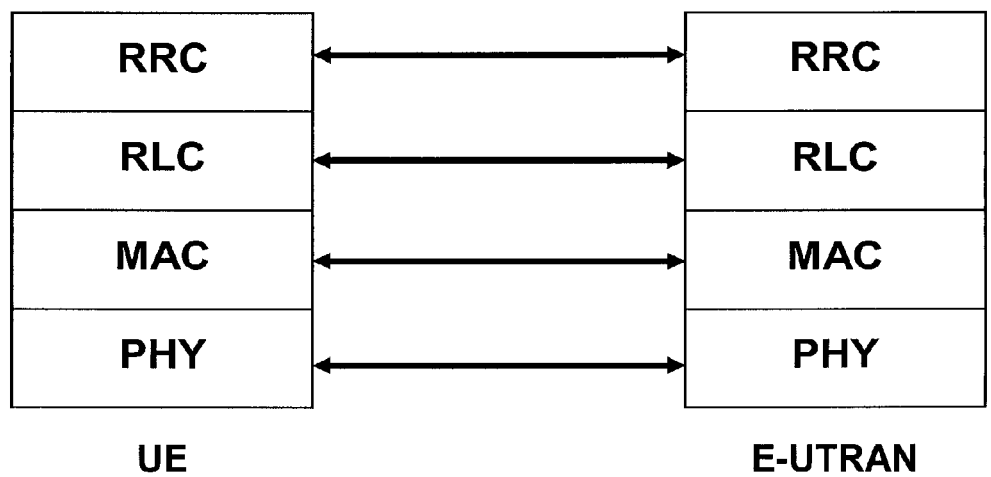
FIG. 2 shows the architecture of a control plane of a radio interface protocol between a terminal and an Evolved-UMTS Terrestrial Radio Access Network (UTRAN) based on 3GPP radio access network standards.
Figure 3:
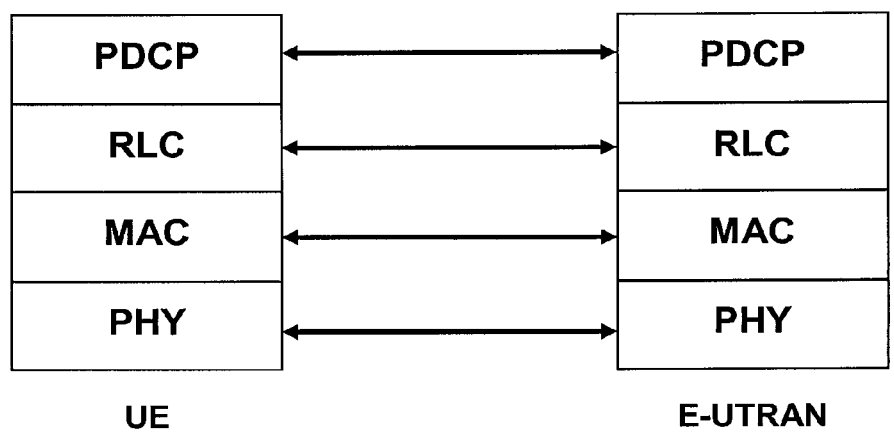
FIG. 3 shows the architecture of a user plane of the radio interface protocol between the terminal and the Evolved-UMTS Terrestrial Radio Access Network (UTRAN) based on 3GPP radio access network standards.
Figure 4:
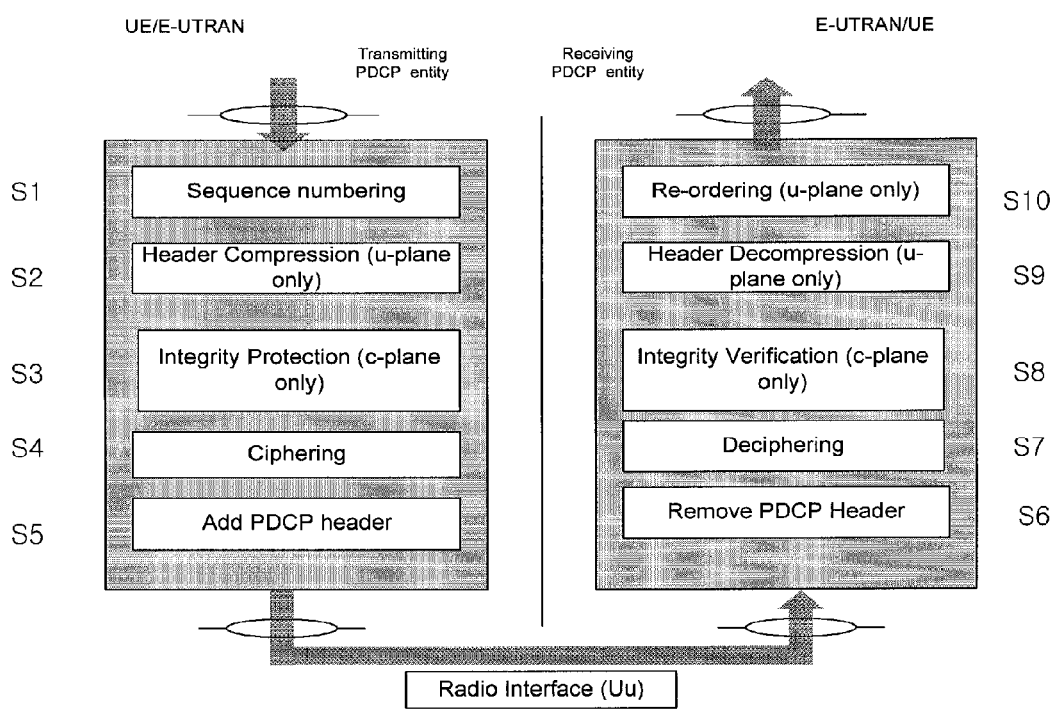
FIG. 4 shows a function structure of a PDCP layer.
Figure 5:
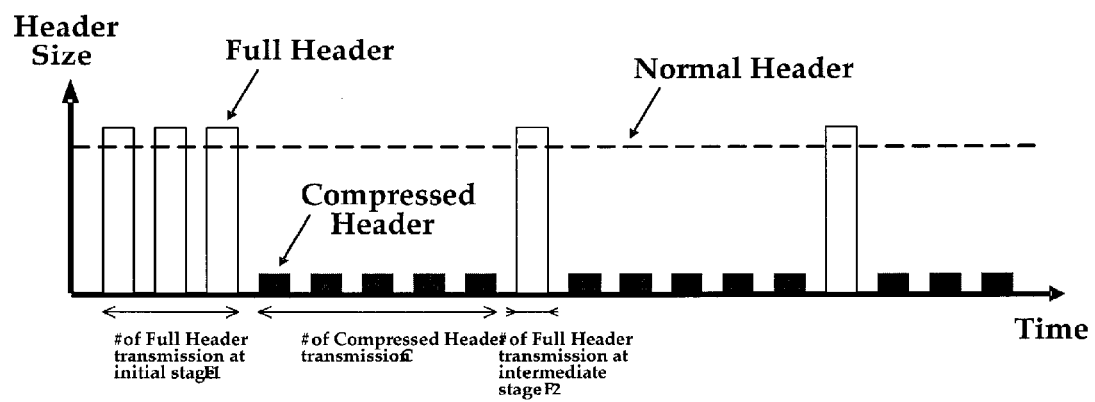
FIG. 5 shows a change in a header size of a packet formed according to an ROHC.
Figure 6:
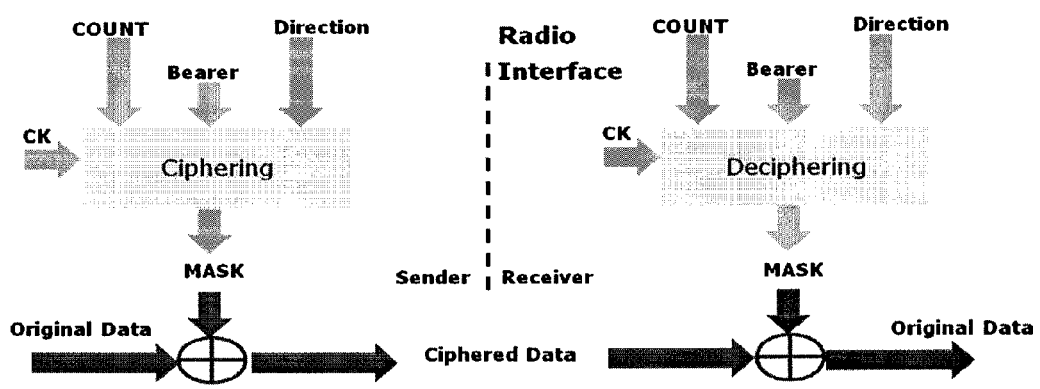
FIG. 6 shows a ciphering method.
Figure 7:
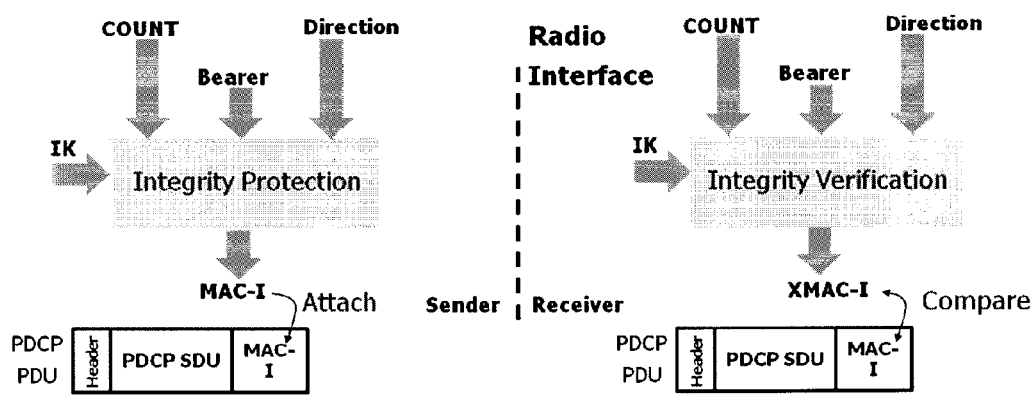
FIG. 7 shows an integrity protection method.

The present invention is applied to a mobile telecommunications system and, more particularly, to an Evolved Universal Mobile Telecommunications System (E-UMTS) that has evolved from UMTS. However, without being limited thereto, the present invention may be also applied to any mobile telecommunications systems and communication protocols to which technical features of the present invention is applicable.

The present invention may be modified variably and may have various embodiments, particular ones of which will be illustrated in drawings and described in detail. However, it should be understood that the following exemplifying description of the invention is not meant to restrict the invention to specific forms of the present invention but rather the present invention is meant to cover all modifications, similarities and alternatives which are included in the spirit and scope of the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned to be "connected" to or "accessing" another component, this may mean that it is directly connected to or accessing the other component, but it is to be understood that another component may exist in-between. On the other hand, when a component is mentioned to be "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Embodiments of the present invention will be described below in detail with reference to the accompanying drawings, where those components are rendered the same reference number that are the same or are in correspondence, regardless of the figure number, and redundant explanations are omitted.

Terms in use in the present invention will be described as follows.

A security failure refers to a phenomenon that an MASK (in case of U-plane) or a MAC-I (in case of C-plane) of a transmitting side or a receiving side is changed to cause an error in ciphering or integrity protection, resulting in an HFN de-synchronization.

A security configuration refers to ciphering and integrity protection, and ciphering herein is performed on a packet (data) of the user plane and the integrity protection is performed on a packet (data) of the control plane.

The present invention is based upon such recognition that, currently, a PDCP layer does not provide a function for detecting an HFN de-synchronization. Thus, the present invention addresses the problem that once an HFN de-synchronization occurs, it cannot be recovered, so all the PDUs received by a receiving side have an error, and thus, the receiving side continuously discards the received PDUs.

A basic concept of the present invention is that 1) conditions for determining a security failure are defined, 2) a receiving side PDCP entity determines whether or not an HFN de-synchronization, namely, a security failure, has occurred by using the particular conditions (i.e., the conditions for determining the security failure), 3) if it is determined that a security failure has occurred, the receiving side PDCP entity informs an RRC layer to re-establish an RB or perform a PDCP RESET procedure, 4) to thereby reset a security configuration of the transmitting side and the receiving side.

The determining conditions of the security failure according to the present invention will now be described in detail.

The determining conditions of the security failure differ according to whether a corresponding RB belongs to the user plane or the control plane.

First, the determining conditions of the security failure in case of the U-plane RB will now be described.

The receiving side performs header decompression on deciphered data. If deciphering is not properly performed, CRC error occurs during header decompression, which results in the failure of the header decompression. Thus, the number of packets failed for header decompression works as a ground for the HFN de-synchronization. Namely, the PDCP counts the number of erroneous packets during the header decompression with respect to the U-plane RB, and if the number of erroneous packets is larger than a reference value (or threshold value), the PDCP layer determines that there is a problem of a security and performs a recovery process of the security failure. To this end, the receiving side PDCP entity uses a variable (or counter) for counting the number of CRC-error packets during the header decompression, and increases the value of the variable whenever an error occurs in a packet. Thereafter, when the variable reaches to a predetermined reference value (threshold value), the PDCP determines that there is a problem in the security configuration. Meanwhile, the reference value may be informed to the transmitting side RRC layer (namely, UE RRC layer) by the receiving side RRC layer (namely, eNB RRC layer) in RB setup, and then to the transmitting side PDCP entity (namely, UE PDCP entity) by the transmitting side RRC layer (UE RRC_layer). The reference value may be previously determined as a particular value and have a different value according to an RB. The value of the variable (or counter) for counting the erroneous packets may be increased whenever errors occur at packets (e.g., if errors occur discontinuously), or may be increased only when errors occur at packets continuously.

Figure 8:
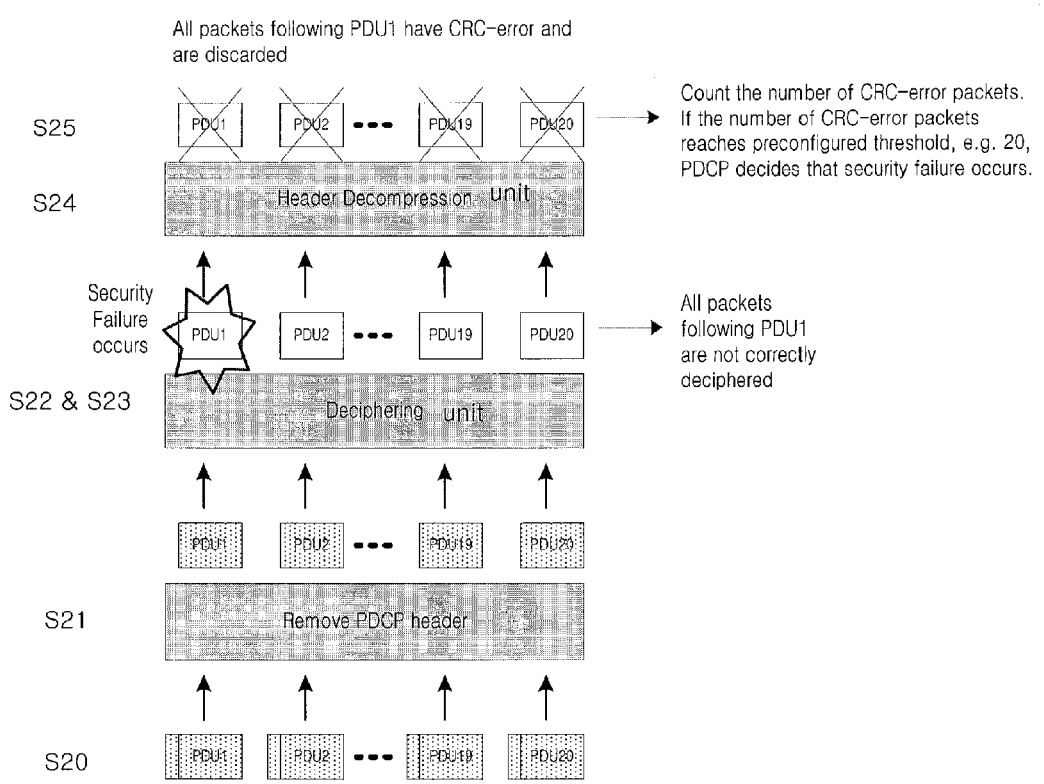
FIG. 8 is a block diagram showing the process of determining a security failure with respect to a user plane RB according to an embodiment of the present invention.

FIG. 8 is a block diagram showing the process of determining a security failure by the receiving side PDCP entity with respect to the user plane RB according to an embodiment of the present invention. The process of determining a security failure in case of the U-plane RB will now be described in detail.

S20: The receiving side PDCP entity receives PDCP PDUS of PDU1~PDU20 from a lower layer, namely, the RLC.

S21: The receiving side PDCP entity removes a header of the received PDUs and delivers them to a deciphering unit.

S22: The deciphering unit of the receiving side PDCP entity performs deciphering on the header-removed PDUs. If a security failure occurs at a PDU1, namely, if an HFN de-synchronization occurs, the PDU1 and all the other subsequent PDUs (namely, PDU2~PDU20) are not properly deciphered.

S23: However, the receiving side PDCP entity does not recognize the fact that the packets (namely, PDU1~PDU20) have not been deciphered properly, and delivers them to a header decompression unit.

S24: The header decompression unit performs header decompression on the received packets, but all of them have an error. The identified error can be determined based on CRC values of the headers.

S25: The receiving side PDCP entity counts the number of packets to which an error has occurred during header decompression. If the number of counted erroneous packets reaches (namely, which is larger than) a predefined reference value (i.e., a threshold value that may be, for example, 20), the receiving side PDCP entity determines that there is an error in the security configuration.

Namely, in the embodiment as shown in FIG. 8, first, when the receiving side PDCP entity performs header decompression on the received packet, it determines an error based on a CRC value of the header. Second, the receiving side PDCP entity counts the number of erroneous packets. Third, if the number of erroneous packets reaches the reference value, the receiving side PDCP entity determines that a security failure has occurred. Upon determining the security failure, the receiving side PDCP entity quickly performs a process of recovering the security failure in order to prevent a possible further data loss and a waste of radio resources. The recovery process may be performed such that, for example, the receiving side RRC layer informs the terminal about the error of the security failure, so that the terminal can cut off its connection to the network and establishes an RRC connection again from the beginning. Alternatively, the RRC layer may re-establish an RB or set up again a security configuration with respect to a particular RB between the terminal (UE) and the network.

First, the conditions for determining a security failure in case of the C-plane RB will be described as follows.

In case of the C-plane RB, header decompression is not performed, and instead, the integrity verification is performed. Thus, the security failure should be determined based on a different basis from that of the U-plane RB. In performing integrity verification, a MAC-I value included in a PDU and an XMAC-I value generated by the receiving side PDCP entity itself are compared. If the two values are different, it is determined that the integrity verification fails and the packets received by the receiving side PDCP entity are discarded. Thus, in the present invention, with respect to the C-plane RB, if packets more than a certain number have an error in performing the integrity verification, it is determined as a security failure, and a process of recovering the security failure is performed. To this end, in performing the integrity verification, the receiving side PDCP entity counts the number of errors, namely, the number of cases where the MAC-I value included in the PDU and the XMAC-I generated by the receiving side PDCP entity itself are different. In other words, the receiving side PDCP entity uses a variable (counter) for counting the number of corresponding packets having different values (the MAC-I value included in the PDUs and the XMAC-1 value generated by the receiving side PDCP entity itself). That is, whenever errors occur at packets, the receiving side PDCP entity increase the value of the variable, and when the variable reaches a predetermined reference value (threshold value), the receiving side PDCP entity determines that there is a problem in the security configuration. Meanwhile, the reference value may be informed to the transmitting side RRC layer (namely, UE RRC_layer) by the receiving side RRC layer (namely, eNB RRC layer) in RB setup, and then to the transmitting side PDCP entity (namely, UE PDCP entity) by the transmitting side RRC layer (UE RRC layer). The reference value may be previously determined as a particular value and have a different value according to an RB. The value of the variable (or counter) for counting the erroneous packets may be increased whenever errors occur at packets (e.g., if errors occur discontinuously), or may be increased only when errors occur at packets continuously.

Figure 9:
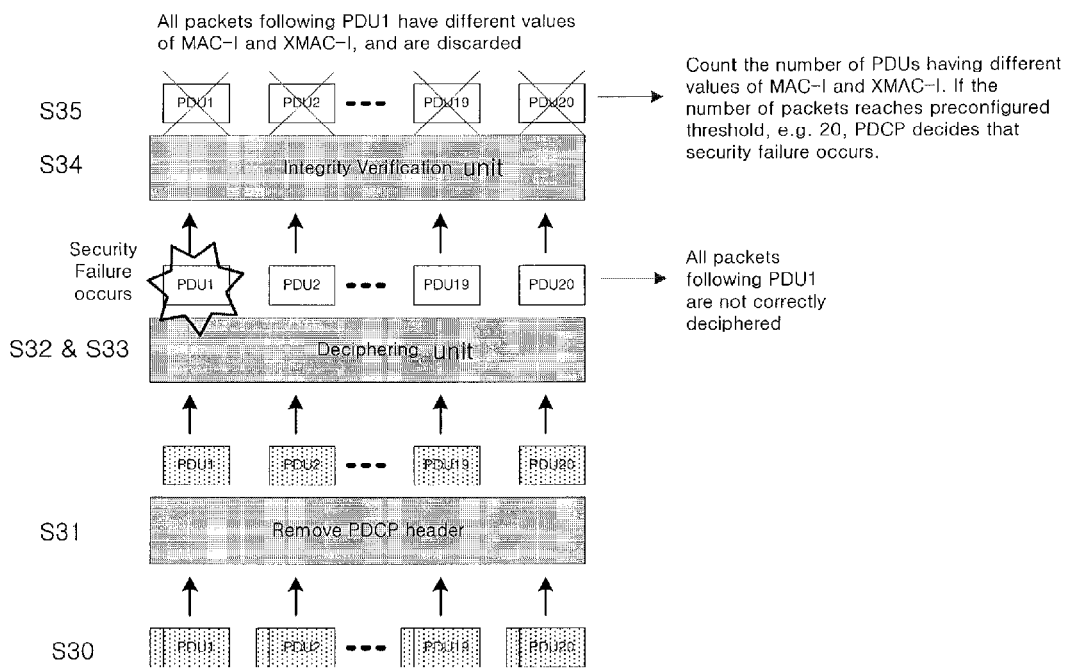
FIG. 9 is a block diagram showing the process of determining a security failure with respect to a control plane RB according to an embodiment of the present invention.

FIG. 9 is a block diagram showing the process of determining a security failure by the receiving side PDCP entity with respect to the control plane RB according to an embodiment of the present invention. The process of determining a security failure with respect to the C-plane RB will now be described in detail.

S30: The receiving side PDCP entity receives PDCP PDUS of PDU1~PDU20 from a lower layer, namely, the RLC layer.

S31: The receiving side PDCP entity removes headers of the received PDUs and delivers them to the deciphering unit.

S32: The receiving side PDCP entity performs deciphering on the header-removed PDUs. If a security failure occurs at a PDU1, namely, if an HFN de-synchronization occurs, the PDU1 and all the other subsequent PDUs (namely, PDU2~PDU20) are not properly deciphered.

S33: However, the receiving side PDCP entity does not recognize the fact that the packets (namely, PDU1~PDU20) have not been deciphered properly, and delivers them to an integrity verification unit.

S34: The integrity verification unit performs integrity verification on the received packets (namely, PDU1~PDU20), but all of them have an error. The identified error can be determined by comparing the MAC-I value included in the PDUs and the XMAC-I value generated by the receiving side PDCP entity itself.

S35: The receiving side PDCP entity counts the number of packets to which an error has occurred during integrity verification. If the number of counted erroneous packets reaches a predefined reference value (which may be, for example, 20), the receiving side PDCP entity determines that there is an error in the security configuration.

The embodiment in FIG. 9 shows the case where the error occurs during the deciphering process. But, actually, an error may occur during the integrity verification process. In this case, the follow-up processing procedure is the same as described above. For example, if deciphering are successfully performed on all the packets but a PDU 1 has an error because of an erroneous integrity verification parameter, all of the subsequent packets would have an error. Thus, in any cases, the number of erroneous packets are counted in the integrity verification to determine whether or not a security failure has occurred.

When the receiving side PDCP entity determines a security failure, the receiving side PDCP entity quickly performs a process of recovering the security failure in order to prevent a possible further data loss and a waste of radio resources. The recovery process may be performed such that, for example, the receiving side RRC layer informs the terminal about the error of the security failure, so that the terminal can cut off its connection to the network and establishes an RRC connection again from the beginning. Alternatively, the RRC layer may re-establish an RB or set up again a security configuration with respect to a particular RB between the terminal (UE) and the network.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A method of performing a re-establishment procedure in a mobile communication system, the method performed by an apparatus that includes a receiver and a controller, the method comprising:
   wirelessly receiving, by the receiver, at least one packet data convergence protocol (PDCP) data unit;
   performing, by a packet data convergence protocol (PDCP) layer of the controller, an integrity check on the received at least one PDCP data unit; and
   performing, by a radio resource control (RRC) layer of the controller, a wireless re-establishment procedure with an external device upon identifying an integrity check failure,
   wherein the integrity check failure is identified by an indication from the PDCP layer.

2. The method of claim 1, wherein the re-establishment procedure comprises at least one of re-establishing a radio bearer (RB) or re-establishing an RRC connection.

3. The method of claim 1, wherein performing the integrity check on the at least one PDCP data unit comprises:
   counting a number of integrity-failed PDCP data units among the received at least one PDCP data unit;
   comparing the counted number of integrity-failed PDCP data units to a reference value; and
   identifying the integrity check failure if the counted number of integrity-failed PDCP data units reaches the reference value.

4. The method of claim 3, wherein the integrity-failed PDCP data units are in a consecutive order.

5. The method of claim 3, wherein the integrity check failure is identified if a message authentication code-integrity (MAC-I) value of the received at least one PDCP data unit is different from an expected message authentication code-integrity (XMAC-I) value generated by the PDCP layer.

6. The method of claim 1, further comprising:
   deciphering, by the PDCP layer, the received at least one PDCP data unit.

7. The method of claim 6, further comprising:
   removing, by the PDCP layer, at least one PDCP header from the received at least one PDCP data unit.

8. The method of claim 1, wherein the at least one PDCP data unit is for a control plane.

9. An apparatus in a mobile communication system, the apparatus comprising:
   a receiver configured to wirelessly receive at least one packet data convergence protocol (PDCP) data unit; and
   a controller operatively connected to the receiver and configured to:
      perform, by a PDCP layer of the controller, an integrity check on the received at least one PDCP data unit; and
      perform, by a radio resource control (RRC) layer of the controller, a wireless re-establishment procedure with an external device upon identifying an integrity check failure,
   wherein the integrity check failure is identified by an indication from the PDCP layer.

10. The apparatus of claim 9, wherein the re-establishment procedure comprises at least one of re-establishing a radio bearer (RB) or re-establishing an RRC connection.

11. The apparatus of claim 9, wherein the controller is configured to perform the integrity check by:
   counting a number of integrity-failed PDCP data units among the received at least one data unit,
   comparing the counted number of integrity-failed PDCP data units to a reference value, and
   identifying the integrity check failure if the counted number of integrity-failed PDCP data units reaches the reference value.

12. The apparatus of claim 11, wherein the integrity-failed PDCP data units are in a consecutive order.

13. The apparatus of claim 11, wherein the integrity check failure is identified if a message authentication code-integrity (MAC-I) value of the received at least one data unit is different from an expected message authentication code-integrity (XMAC-I) value generated by the PDCP layer.

14. The apparatus of claim 9, wherein the controller is further configured to decipher the received at least one PDCP data unit.

15. The apparatus of claim 14, wherein the receiver is further configured to remove at least one PDCP header from the received at least one PDCP data unit.

16. The apparatus of claim 9, wherein the at least one PDCP data unit is for a control plane.

* * * * *